US011915370B2

(12) United States Patent
Yun et al.

(10) Patent No.: US 11,915,370 B2
(45) Date of Patent: Feb. 27, 2024

(54) METHOD AND SYSTEM FOR 3D MODELING BASED ON IRREGULAR-SHAPED SKETCH

(71) Applicant: RECON LABS INC., Seoul (KR)

(72) Inventors: Kyungwon Yun, Seoul (KR); Roger Blanco, Goyang-si (KR); Kyung Hoon Hyun, Seoul (KR); Seonghoon Ban, Seoul (KR)

(73) Assignee: RECON LABS INC., Seoul (KR)

( * ) Notice: Subject to any disclaimer, the term of this patent is extended or adjusted under 35 U.S.C. 154(b) by 173 days.

(21) Appl. No.: 17/583,306

(22) Filed: Jan. 25, 2022

(65) Prior Publication Data

US 2023/0215093 A1 Jul. 6, 2023

(30) Foreign Application Priority Data

Dec. 30, 2021 (KR) ........................ 10-2021-0192463

(51) Int. Cl.
*G06T 17/10* (2006.01)
*G06T 17/20* (2006.01)
*G06N 20/00* (2019.01)
*G06T 7/70* (2017.01)

(52) U.S. Cl.
CPC ............. *G06T 17/10* (2013.01); *G06N 20/00* (2019.01); *G06T 7/70* (2017.01); *G06T 17/20* (2013.01); *G06T 2207/20081* (2013.01)

(58) Field of Classification Search
None
See application file for complete search history.

(56) References Cited

U.S. PATENT DOCUMENTS

2020/0210845 A1 7/2020 Sanchez Bermudez et al.

FOREIGN PATENT DOCUMENTS

| JP | 2020109661 A | 7/2020 |
| KR | 1020050023004 A | 3/2005 |
| KR | 101462419 B1 | 11/2014 |
| KR | 1020200114429 A | 10/2020 |

OTHER PUBLICATIONS

Bimber et al., A multi-layered architecture for sketch-based interaction within virtual environments, Dec. 2000, Computers & Graphics, 851-867 (Year: 2000).*

* cited by examiner

Primary Examiner — Robert J Craddock
(74) Attorney, Agent, or Firm — Dinsmore & Shohl LLP (57) ABSTRACT

Provided is a method for 3D modeling based on an irregular-shaped sketch, in which the method is executed by one or more processors, and includes receiving 2D sketch data of a target object, inputting the 2D sketch data into a 3D model generation model to generate a 3D model of the target object, and displaying the generated 3D model on a display.

9 Claims, 9 Drawing Sheets

METHOD AND SYSTEM FOR 3D MODELING BASED ON IRREGULAR-SHAPED SKETCH

CROSS-REFERENCE TO RELATED APPLICATION

This application claims priority under 35 U.S.C § 119 to Korean Patent Application No. 10-2021-0192463, filed in the Korean Intellectual Property Office on Dec. 30, 2021, the entire contents of which are hereby incorporated by reference.

TECHNICAL FIELD

The present disclosure relates to a method and a system for 3D modeling based on an irregular-shaped sketch, and more particularly, to a method and a system for generating a 2D sketch to a 3D model and then correcting the 3D model according to user input.

BACKGROUND

Freehand sketch is an effective and efficient way of visualizing various design ideas in the early stages of design to simulate shapes, production methods, functions, and the like. To this end, designers conduct design simulations by using various sketch programs.

However, the related sketch programs rely heavily on the development of 3D conversion technologies for converting 2D sketch images into 3D images. Accordingly, for the 3D image conversion, it requires extra effort and adaptation period of the designers to produce 2D sketch images to be converted into 3D images, and there are limitations on programs for drawing 2D sketch images.

In addition, the related sketch programs have a problem in that, if there is a need for correction for the converted 3D model, the 2D sketch image has to be sketched from the beginning. Accordingly, designers have difficulties in developing design concepts through simulations of various sketches.

SUMMARY

In order to solve the problems described above, the present disclosure provides a method, a computer program stored in a recording medium, and an apparatus (system) for 3D modeling based on an irregular-shaped sketch.

The present disclosure may be implemented in a variety of ways, including a method, a device (system) or a computer program stored in a readable storage medium.

According to an embodiment, a method for automatically generating a 3D model is provided, which may be executed by one or more processors and include receiving 2D sketch data of a target object, inputting the 2D sketch data into a 3D model generation model to generate a 3D model of the target object, and displaying the generated 3D model on a display.

According to an embodiment, the generating the 3D model may include inputting the 2D sketch data into a first machine learning model to extract an image feature array, inputting the extracted image feature array into a second machine learning model to determine positions of 3D vertices for expressing the 3D model, and inputting the determined positions of the 3D vertices into a third machine learning model to infer a connection relationship between the 3D vertices.

According to an embodiment, the receiving the 2D sketch data may include receiving a plurality of strokes from a user, and the method may include receiving an additional stroke from the user, inputting the additional stroke into the 3D model generation model to generate an updated 3D model of the target object, and displaying the updated 3D model on the display.

According to an embodiment, the additional stroke may be received while the 2D sketch data is displayed on the display.

According to an embodiment, the additional stroke may be received while the 3D model is displayed on the display.

According to an embodiment, the 3D model generation model may be a machine learning model trained by using a plurality of 3D model training data, and a plurality of 2D sketch training data generated based on the plurality of 3D model training data.

According to an embodiment, the receiving the 2D sketch data may include receiving a plurality of strokes from a user, inputting the plurality of strokes into a stroke recommendation model to generate a stroke recommendation, and displaying the stroke recommendation on the display.

According to an embodiment, the stroke recommendation may be displayed in a superimposed manner with the plurality of strokes, and the stroke recommendation may be displayed in a color or transparency different from that of the plurality of strokes.

A computer program is provided, which is stored on a computer-readable recording medium for executing, on a computer, a method for 3D modeling based on an irregular-shaped sketch according to an embodiment.

According to an embodiment, an information processing system is provided, which may include a communication module, a memory, and one or more processors connected to the memory and configured to execute one or more computer-readable programs included in the memory, in which the one or more programs may include instructions for receiving 2D sketch data of a target object from a user, inputting the 2D sketch data into a 3D model generation model to generate a 3D model of the target object, and displaying the generated 3D model on a display.

According to some embodiments of the present disclosure, after modeling of a 2D image into a 3D image, it is possible to effectively search for a variety of combinations of designs in the initial design stage by correcting the 3D model according to user inputs.

According to some embodiments of the present disclosure, by generating a 3D model by using stroke information of a 2D sketch image, it is possible to more efficiently utilize information generated during a designing process.

According to some embodiments of the present disclosure, a stroke similar to a stroke input by the user or a subsequent stroke(s) is recommended in the process of correcting the 3D model, and as a result, thus enabling the user to more easily perform the 2D sketching work.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in specific cases, certain terms may be arbitrarily selected by the applicant, and the meaning of the terms will be described in detail in a corresponding description of the embodiments. Therefore the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, the "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In the present disclosure, the "machine learning model" may include any model that is used for inferring an answer to a given input. According to an embodiment, the machine learning model may include an artificial neural network model including an input layer, a plurality of hidden layers, and an output layer, where each layer may include a plurality of nodes. In the present disclosure, the machine learning model may refer to an artificial neural network model or deep learning model, and the artificial neural network model or deep learning model may refer to the machine learning model. In the present disclosure, a "3D model generation model" may be implemented as the machine learning model. In some embodiments of the present disclosure, a model described as one machine learning model may include a plurality of machine learning models, and a plurality of models described as separate machine learning models may be implemented as a single machine learning model.

In the present disclosure, a "display" may refer to any display device associated with a computing device, and for example, it may refer to any display device that is controlled by the computing device, or that can display any information/data provided from the computing device.

In the present disclosure, "each of a plurality of A" may refer to each of all components included in the plurality of A, or may refer to each of some of the components included in a plurality of A.

Figure 1:
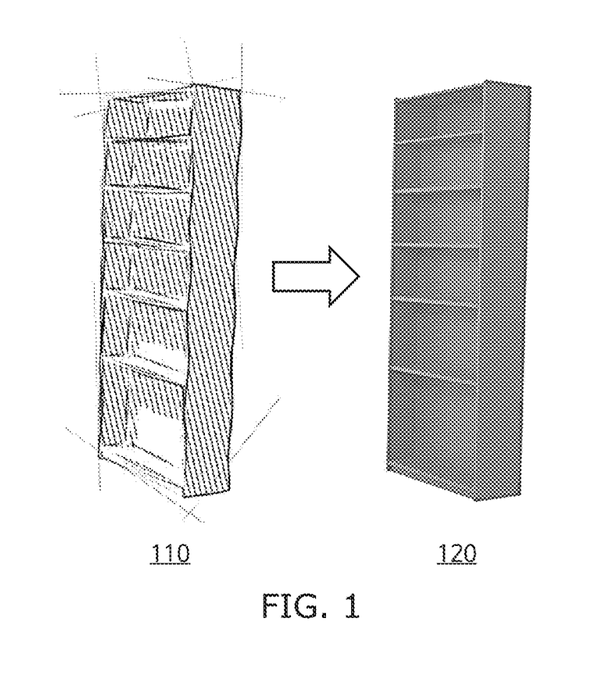
FIG. 1 illustrates an example of converting 2D sketch data into a 3D model according to an embodiment.

FIG. 1 illustrates an example of generating a 3D model by using a 2D sketch image according to an embodiment. According to an embodiment, a user may input 2D sketch data to a user terminal by using an input device. The input device may be provided in the user terminal itself, or may be configured to transmit and receive 2D sketch data input by the user through the user terminal and wireless or wired. For example, the input device may be a digital pen, a tablet device, or the like.

As illustrated in FIG. 1, the user may input 2D sketch data for a target object by using the input device, and transmit the input 2D sketch data to the user terminal. The target object herein refers to an object that the user intends to sketch. For example, as illustrated in FIG. 1, the target object may be a bookshelf, and the user may input 2D sketch data 110 for the bookshelf through the input device. The 2D sketch data 110 may include a plurality of strokes.

The user terminal may transmit the 2D sketch data 110 to an information processing system. The information processing system may convert and generate the received 2D sketch data 110 into a 3D model by using a 3D model transformation model of the 2D sketch data. For the model and algorithm for the 3D conversion of the 2D sketch data, reference is made to the description of FIG. 8 which will be described below.

When the 2D sketch data is converted into a 3D model, the information processing system may display the 3D model 120 on a display of the user terminal. The information processing system may correct the 3D model on the basis of receiving a user input for correction of 3D model while the 3D model 120 is displayed. For the correction of 3D model, reference is made to the description of FIG. 3 which will be described below.

Meanwhile, while it is described above that the process of generating a 3D model by using the 2D sketch data is performed by the information processing system, embodiments are not limited thereto and it may be implemented differently in certain embodiments. For example, at least part or all of a series of processes for generating a 3D model from 2D sketch data may be performed by the user terminal. However, for convenience of explanation, the following description will be made on the premise that the 3D model generation process is performed by the information processing system.

According to the disclosure, the user may generate a 3D model only with 2D sketch data that is constructed of strokes, without having to generate a 2D image of a limited shape to generate the 3D model. Therefore, it is possible to efficiently perform image simulation for a variety of designs.

Figure 2:
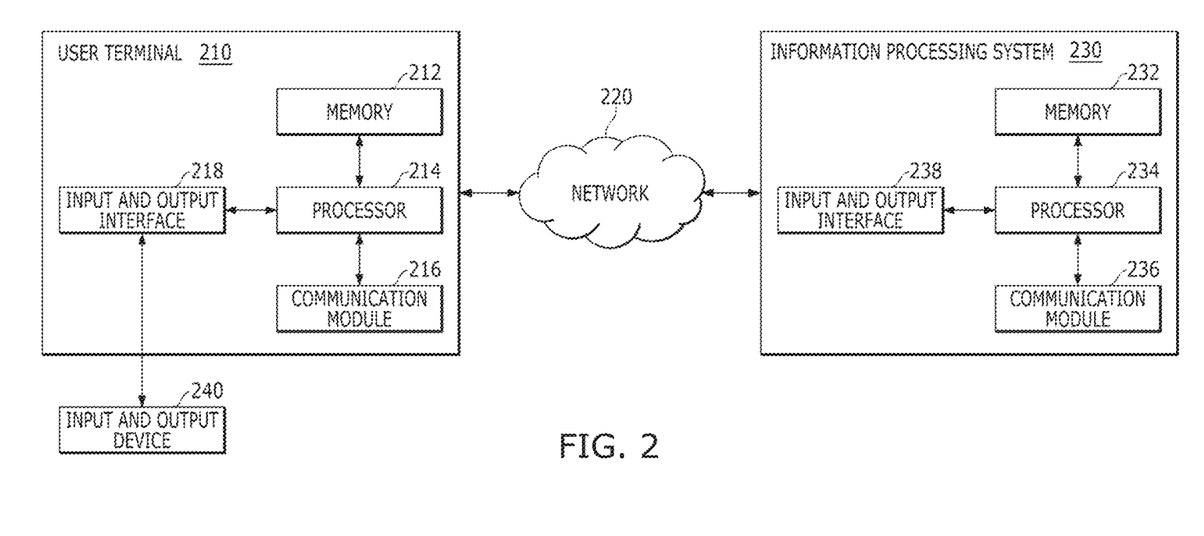
FIG. 2 is a block diagram illustrating an internal configuration of a user terminal and an information processing system according to an embodiment.

FIG. 2 is a block diagram illustrating an internal configuration of a user terminal 210 and an information processing system 230 according to an embodiment. The user terminal 210 may refer to any computing device that is capable of executing a 3D modeling application, a web browser, and the like and capable of wired/wireless communication, and may include a mobile phone terminal, a tablet terminal, a PC terminal, and the like, for example. As illustrated, the user terminal 210 may include a memory 212, a processor 214, a communication module 216, and an input and output interface 218. Likewise, the information processing system 230 may include a memory 232, a processor 234, a communication module 236, and an input and output interface 238. As illustrated in FIG. 2, the user terminal 210 and the information processing system 230 may be configured to communicate information and/or data through a network 220 by using the respective communication modules 216 and 236. In addition, an input and output device 240 may be configured to input information and/or data to the user terminal 210 or to output information and/or data generated from the user terminal 210 through the input and output interface 218.

The memories 212 and 232 may include any non-transitory computer-readable recording medium. According to an embodiment, the memories 212 and 232 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and at least one program code (e.g., a code for a 3D modeling application, and the like installed and driven in the user terminal 210) may be stored in the memories 212 and 232.

These software components may be loaded from a computer-readable recording medium separate from the memories 212 and 232. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 212 and 232 through the communication modules rather than the computer-readable recording medium. For example, at least one program may be loaded into the memories 212 and 232 based on a computer program installed by files provided by developers or a file distribution system that distributes an installation file of an application through the network 220.

The processors 214 and 234 may be configured to process the instructions of the computer program by performing basic arithmetic, logic, and input and output operations. The instructions may be provided to the processors 214 and 234 from the memories 212 and 232 or the communication modules 216 and 236. For example, the processors 214 and 234 may be configured to execute the received instructions according to program code stored in a recording device such as the memories 212 and 232.

The communication modules 216 and 236 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to generate a 3D model, 2D sketch data for a target object, and the like) generated by the processor 214 of the user terminal 210 according to the program code stored in the recording device such as the memory 212 or the like may be transmitted to the information processing system 230 through the network 220 under the control of the communication module 216. Conversely, a control signal or a command provided under the control of the processor 234 of the information processing system 230 may be received by the user terminal 210 through the communication module 216 of the user terminal 210 via the communication module 236 and the network 220. For example, the user terminal 210 may receive 3D model data of the target object from the information processing system 230 through the communication module 216.

The input and output interface 218 may be a means for interfacing with the input and output device 240. As an example, the input device may include a device such as a camera, a keyboard, a microphone, a mouse, and so on, which includes an audio sensor and/or an image sensor, and the output device may include a device such as a display, a speaker, a haptic feedback device, and so on. As another example, the input and output interface 218 may be a means for interfacing with a device, such as, for example, a touch screen or the like that integrates a configuration or function for performing inputting and outputting. For example, when the processor 214 of the user terminal 210 processes the instructions of the computer program loaded in the memory 212, a service screen or the like, which is configured with the information and/or data provided by the information processing system 230 or other user terminals, may be displayed on the display through the input and output interface 218. While FIG. 2 illustrates that the input and output device 240 is not included in the user terminal 210, embodiments are not limited thereto, and the input and output device 240 may be configured as one device with the user terminal 210. In addition, the input and output interface 238 of the information processing system 230 may be a means for interface with a device (not illustrated) for inputting or outputting that may be connected to, or included in the information processing system 230. In FIG. 2, while the input and output interfaces 218 and 238 are illustrated as the components configured separately from the processors 214 and 234, embodiments are not limited thereto, and the input and output interfaces 218 and 238 may be configured to be included in the processors 214 and 234.

The user terminal 210 and the information processing system 230 may include more than those components illustrated in FIG. 2. Meanwhile, most of the related components may not necessarily require exact illustration. According to an embodiment, the user terminal 210 may be implemented to include at least a part of the input and output device 240 described above. In addition, the user terminal 210 may further include other components such as a transceiver, a Global Positioning System (GPS) module, a camera, various sensors, a database, and the like. For example, when the user terminal 210 is a smartphone, it may generally include components included in the smartphone, and for example, it may be implemented such that various components such as an acceleration sensor, a gyro sensor, a camera module, various physical buttons, buttons by using a touch panel, input and output ports, a vibrator for vibration, and so on are further included in the user terminal 210. According to an embodiment, the processor 214 of the user terminal 210 may be configured to operate an application or the like that provides a 3D model generation service. In this case, a code associated with the application and/or program may be loaded into the memory 212 of the user terminal 210.

While the program for the application or the like that provides the 3D model generation service is being operated, the processor 214 may receive text, image, video, audio, and/or action, and so on inputted or selected through the input device such as a camera, a microphone, and so on, that includes a touch screen, a keyboard, an audio sensor and/or an image sensor connected to the input and output interface 218, and store the received text, image, video, audio, and/or action, and so on in the memory 212, or provide the same to the information processing system 230 through the communication module 216 and the network 220. For example, the processor 214 may receive 2D sketch data through the input and output interface 218 and the input device, and receive a user input requesting generation of a 3D model of the target object and provide the 2D sketch data to the information processing system 230 through the communication module 216 and the network 220. As another example, when the 2D sketch data is corrected, the processor 214 may provide the corrected 2D sketch data to the information processing system 230 through the communication module 216 and the network 220.

The processor 214 of the user terminal 210 may be configured to manage, process, and/or store the information and/or data that may be received from the input device 240, the other user terminals, the information processing system 230 and/or a plurality of external systems. The information and/or data processed by the processor 214 may be provided to the information processing system 230 through the communication module 216 and the network 220. The processor 214 of the user terminal 210 may transmit the information and/or data to the input and output device 240 through the input and output interface 218 to output the same. For example, the processor 214 may display the received information and/or data on the screen of the user terminal.

The processor 234 of the information processing system 230 may be configured to manage, process, and/or store information and/or data received from a plurality of user terminals 210 and/or a plurality of external systems. The information and/or data processed by the processor 234 may be provided to the user terminals 210 through the communication module 236 and the network 220. For example, the processor 234 of the information processing system 230 may receive 2D sketch data from the user terminal 210, and input the 2D sketch data to the 3D model generation model to generate a 3D model. The processor 234 of the information processing system 230 may provide the generated 3D model to the user terminal 210 through the communication module 236 and the network 220.

The processor 234 of the information processing system 230 may be configured to output the processed information and/or data through the output device 240 such as a device (e.g., a touch screen, a display, and so on) capable of outputting a display of the user terminal 210 or a device (e.g., a speaker) capable of outputting an audio. For example, the processor 234 of the information processing system 230 may be configured to provide the 3D model of the target object to the user terminal 210 through the communication module 236 and the network 220, and output the 3D model through a device of the user terminal 210, which is capable of outputting a display, or the like.

Figure 3:
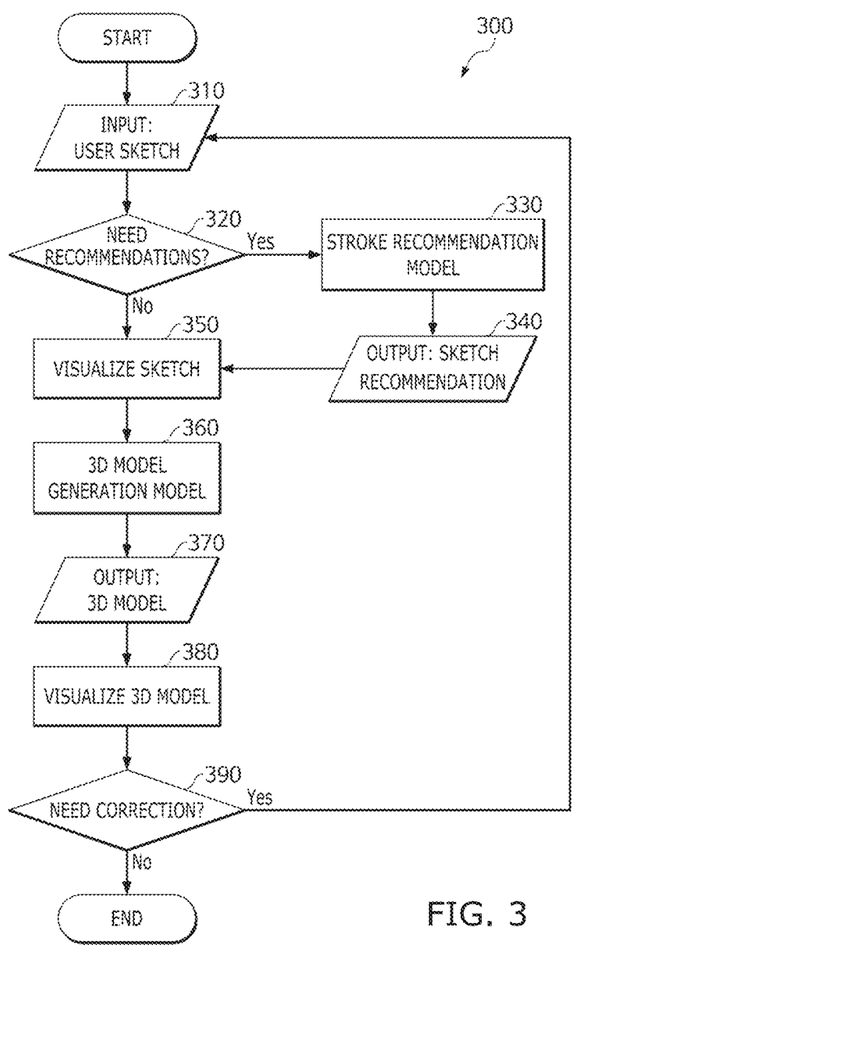
FIG. 3 is a flowchart illustrating an example of a method for correcting a 3D model based on an irregular-shaped sketch according to an embodiment.

FIG. 3 is a flowchart illustrating an example of a method for correcting a 3D model based on an irregular-shaped sketch according to an embodiment. According to an embodiment, the user terminal 210 may receive (310) 2D sketch data of the target object. The user may input a 2D sketch of the target object through an input device connected to the user terminal 210 by wire or wirelessly. For example, the user may input 2D sketch data by using a WebGL-based 3D framework.

The 2D sketch data may include a plurality of strokes. That is, the user terminal 210 may receive a plurality of strokes included in the 2D sketch data from the user. The user terminal 210 may transmit the 2D sketch data to the information processing system 230.

When the 2D sketch data is received, the information processing system 230 may determine (320) whether or not a stroke recommendation is necessary. For example, the information processing system 230 may determine whether or not the stroke recommendation is necessary on the basis of a user input.

When determining that a stroke recommendation is necessary, the information processing system 230 may input (330) a plurality of strokes included in the sketch data of the user to the stroke recommendation model to generate a stroke recommendation. Specifically, the stroke recommendation model may generate a stroke recommendation based on at least one of a stroke drawing style of the user, and a kind of the target object. Here, the stroke recommendation may include a single stroke or a plurality of strokes.

The stroke recommendation model may use a pre-stored sketch database to recommend a stroke based on the stroke drawing style of the user and/or the kind of the target object. For the stroke recommendation model, a data-based design learning model, a natural language processing learning model using a 3D model generation and modification technique, and the like may be used, but embodiments are not limited thereto, and various algorithms and models for machine learning may be used.

The sketch database used in the stroke recommendation model may include a plurality of strokes included in past sketch data of various users. To this end, the information processing system 230 may store 2D sketch data including the input stroke as an image each time the users input strokes. Accordingly, the stroke recommendation model may recommend strokes similar to the stroke drawing style of the same or different users, and may shorten the time required for the user to generate a sketch.

The information processing system 230 may visualize (350) the 2D sketch data on the display. When there is a stroke recommendation, the information processing system 230 may display a plurality of strokes included in the 2D sketch data and the stroke recommendation in a superimposed manner.

When displaying the 2D sketch data input by the user and the stroke recommendation in a superimposed manner, the information processing system 230 may display the plurality of strokes included in the 2D sketch data and the stroke recommendation such that they are visually distinguishable from each other. For example, the information processing system 230 may display the plurality of strokes included in the 2D sketch data and the stroke recommendation in different colors. As another example, the information processing system 230 may display the plurality of strokes included in the 2D sketch data and the stroke recommendation with different transparencies. Accordingly, the user may visually distinguish the stroke input by the user from the stroke recommendation.

After sketch visualization, the information processing system 230 may input 2D sketch data into the 3D model generation model to generate (360) a 3D model of the target object. In this example, the 3D model generation model may be a machine learning model trained by using a plurality of 3D models and a plurality of 2D sketch data automatically generated from the plurality of 3D models as training data. When there is a stroke recommendation, the information processing system 230 may input the plurality of strokes included in the 2D sketch data and the stroke recommendation into the 3D model generation model to generate a 3D model. The method for generating a 3D model by using the 3D model generation model will be described below in detail with reference to FIG. 8.

When the 3D model is generated, the information processing system 230 may display (370) the generated 3D model on the display. Accordingly, the user may check the 3D model of the 2D sketch through the display.

Meanwhile, the information processing system 230 may visualize (380) the 3D model in any one of a 2D view, a 3D view, and a recommendation view. The 2D view refers to a function of displaying the 2D sketch data input by the user on the display. The 3D view refers to a function of displaying the generated 3D model on the display. The recommendation view refers to a function of displaying the stroke recommendation on the 2D sketch data (or 3D model). The information processing system 230 may display any one of the 2D view, the 3D view, and the recommendation view on the display based on a user input.

The information processing system 230 may determine (390) whether the 3D model needs to be corrected. The information processing system 230 may receive a user input for correcting the 3D model, while the 3D model is in a visualized state. For example, the information processing system 230 may receive an additional stroke for correcting the 3D model while the 2D sketch data is displayed on the display. As another example, the information processing system 230 may receive an additional stroke for correcting the 3D model while the 3D model is displayed on the display.

In this case, the information processing system 230 may return to the step of receiving (310) the 2D sketch data and generate 2D sketch data that includes the additional stroke. In addition, the information processing system 230 may display the generated 2D sketch data on the display. Then, the information processing system 230 may newly generate a 3D model by using the generated 2D sketch data.

Meanwhile, while the 3D model is in the visualized state, on the basis of receiving a user input indicating that the 3D model does not need to be corrected, the information processing system 230 may end the generation of the 3D model. In this case, the information processing system 230 may store the finally generated 3D model in the database.

The method for correcting a 3D model by using strokes of 2D sketch data has been described above. Through this, the user may more easily perform the correction of the 3D model by using the 2D sketch data or the 3D model view. In addition, the user may more conveniently generate a 3D model for a variety of designs.

Hereinafter, a method for displaying a stroke recommendation and a method for generating a 3D model according to an embodiment will be described.

Figure 4:
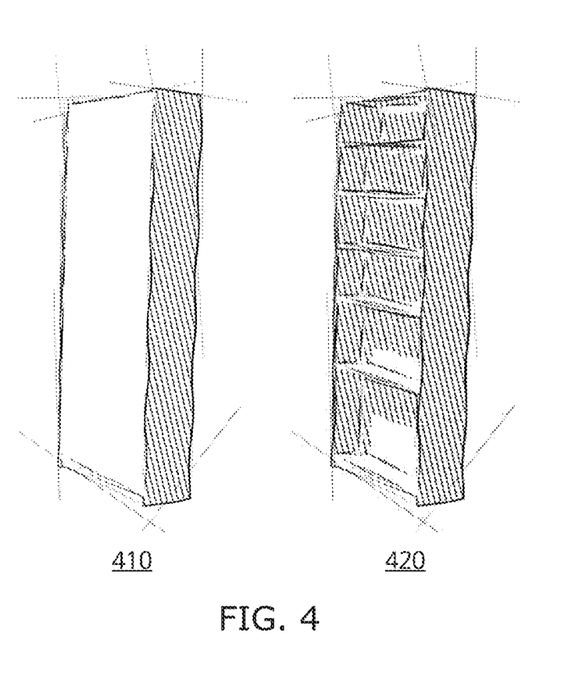
FIG. 4 illustrates an example of how a stroke recommendation model displays a stroke recommendation according to an embodiment.

FIG. 4 illustrates an example of how a stroke recommendation model displays a stroke recommendation according to an embodiment. Referring to FIG. 4, the user may input 2D sketch data 410 including a plurality of strokes by using the input device.

The information processing system 230 may input a plurality of strokes included in the 2D sketch image to the stroke recommendation model. The stroke recommendation model may be a model configured to generate a subsequent stroke based on the strokes input so far, or to generate subsequent strokes for completing a final 2D sketch image. For example, the stroke recommendation model may generate a stroke recommendation based on a pre-stored database.

When at least one or more stroke recommendations are generated, the information processing system 230 may display (420) the at least one or more stroke recommendations on the 2D sketch data 410 input by the user in a superimposed manner. In this case, the stroke recommendation may be displayed such that it is visually distinguished from a plurality of strokes included in the 2D sketch data 410 input by the user. For example, the information processing system 230 may display the stroke recommendation and the plurality of strokes included in the 2D sketch data 410 input by the user in different colors. As another example, the information processing system 230 may display the stroke recommendation and the plurality of strokes included in the 2D sketch data 410 input by the user with different transparencies. As still another example, the information processing system 230 may display the stroke recommendation and the plurality of strokes included in the 2D sketch data 410 input by the user with different thicknesses. Accordingly, the user can check the stroke directly input by himself or herself and the stroke recommendation at a glance, and easily determine whether or not to use the stroke recommendation.

Figure 5:
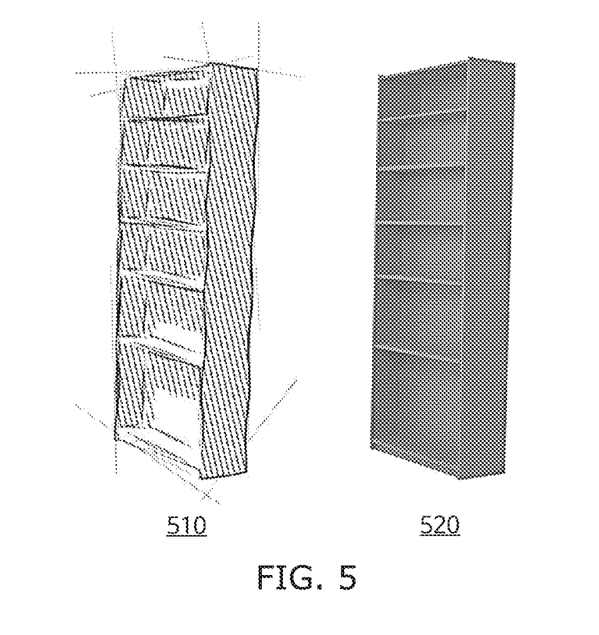
FIG. 5 illustrates an example in which 2D sketch data including a stroke recommendation is converted into a 3D model.

FIG. 5 illustrates an example in which 2D sketch data including a stroke recommendation is converted into a 3D model. As illustrated, in a state 510 in which the 2D sketch data input by the user and the stroke recommendation are displayed, the information processing system 230 may generate a 3D model 520 on the basis of receiving a user input for generating a 3D model. Through this, the user can more conveniently generate a 2D sketch and a 3D model.

Meanwhile, although not illustrated, while the stroke recommendation is displayed, the user may not generate a 3D model by using the stroke recommendation. Specifically, on the basis of receiving a user input for deleting a stroke recommendation, the information processing system 230 may stop displaying the stroke recommendation. In this case, the information processing system 230 may generate a 3D model by using the 2D sketch data input by the user. The method for generating a 3D model by using 2D sketch data including a plurality of strokes has been described above.

Hereinafter, a method for correcting a 3D model will be described.

Figure 6:
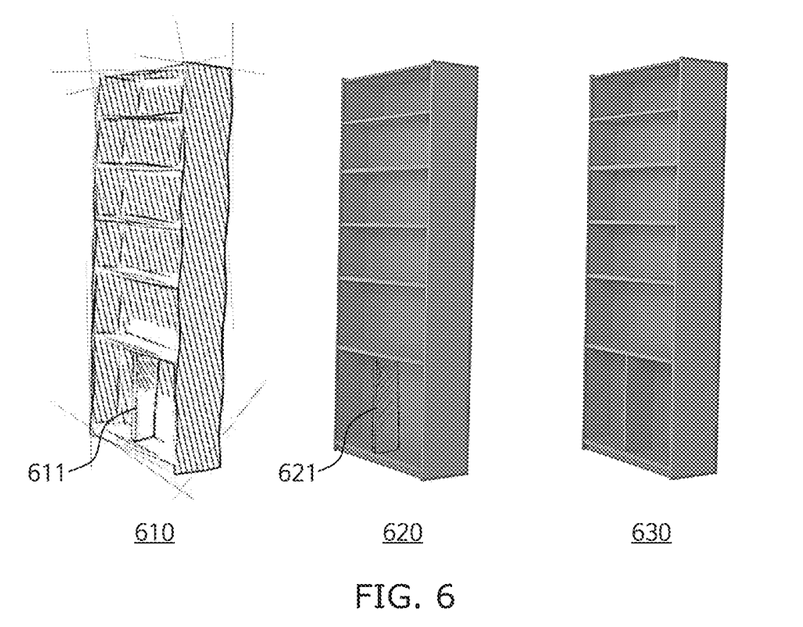
FIG. 6 illustrates an example of a method for correcting a 3D model by using an additional stroke according to an embodiment.

FIG. 6 illustrates an example of a method for correcting a 3D model by using an additional stroke according to an embodiment. As illustrated, while 2D sketch data 610 is displayed, the information processing system 230 may receive an additional stroke 611 for correcting the 3D model. The additional stroke 611 may be recommended by a stroke recommendation model or may be input by a user input through the input device.

When the additional stroke 611 is input, the information processing system 230 may input the 2D sketch data 610 including the additional stroke to the 3D model generation model. In this case, the information processing system 230 may generate an updated 3D model 630 that includes the additional stroke. The updated 3D model 630 may include a 3D structure corresponding to the additional stroke.

Additionally or alternatively, the information processing system 230 may receive an additional stroke 621 for correcting the 3D model while 3D model 620 is displayed. In this case, the information processing system 230 may generate new 2D sketch data combining the 3D model 620 and the additional stroke 621. In addition, the information processing system 230 may input new 2D sketch data into the 3D model generation model to newly generate the 3D model 630. Alternatively, the information processing system 230 may directly generate and update the 3D model based on the 3D model 620 and the additional stroke 621.

The method for correcting a 3D model has been described above. Through this, the user can easily correct the 3D model without having to newly generate the 2D sketch data.

Hereinafter, a user interface of a program for correcting a 3D model according to embodiment of the disclosure will be described.

Figure 7:
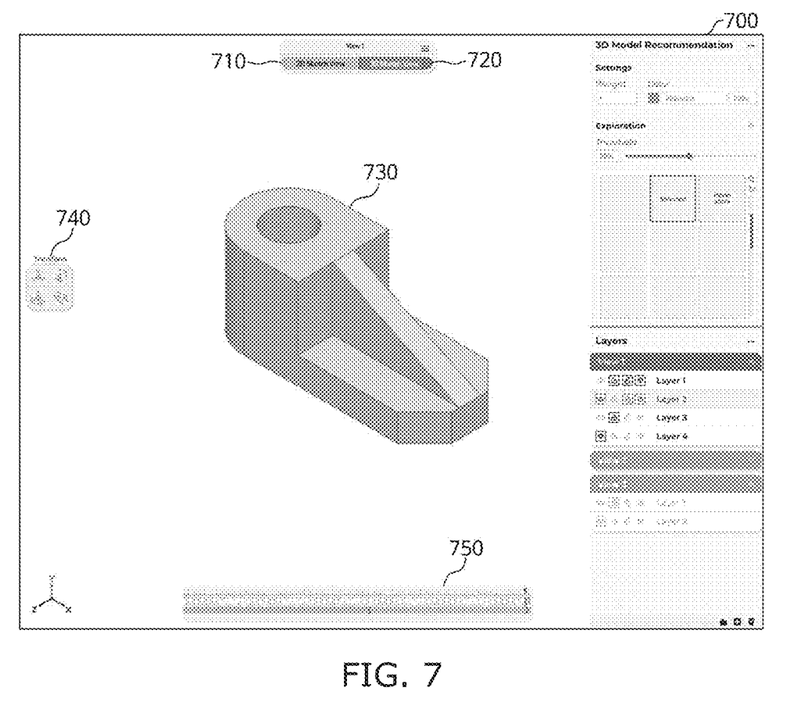
FIG. 7 illustrates an example of a user interface of a program for generating and correcting a 3D model by using a stroke of a 2D sketch according to an embodiment.

FIG. 7 illustrates an example of a user interface of a program for generating and correcting a 3D model by using a stroke of a 2D sketch according to an embodiment. As illustrated, a user interface 700 of the program for generating and correcting the 3D model according to an embodiment may include an icon for selecting a view mode. First, when a 2D sketch view mode icon 710 is selected, 2D sketch data for the target object input by the user may be displayed. The information processing system 230 may receive 2D sketch data including a plurality of strokes in a 2D sketch view mode.

In the 2D sketch view mode, a menu 750 for checking the past strokes of the user may also be displayed. The menu 750 for checking the past strokes may be configured in the form of a slide bar. The slide bar may include at least one or more indicators corresponding to strokes input in the past. Accordingly, based on a user input for selecting a specific indicator of the slide bar, the information processing system 230 may display a stroke corresponding to the selected indicator on the central area of the user interface 700 or display only the strokes input prior to the selected indicator in the central area. Accordingly, the user can easily check the strokes entered in the past, and conveniently perform correction on the 2D sketch by using the past strokes.

Next, when a 3D sketch view mode icon 720 is selected, the information processing system 230 may display a 3D model 730 generated based on the 2D sketch input by the user. The information processing system 230 may receive an additional stroke for correcting the 3D model while the 3D model is displayed. In addition, the user may perform size transformation, rotation, and the like of the 3D model by using an icon 740 for selecting a method of displaying the 3D model.

In an embodiment, the user may select a stroke recommendation menu (not illustrated) to receive from the information processing system 230 a stroke recommendation generated based on the 2D sketch data. The user can more conveniently complete the 2D sketch data by using the stroke recommendation provided by the system. For example, the stroke recommendation provided by the system may be displayed together with the stroke input by the user in the central area on the 2D sketch data. In another example, the plurality of stroke recommendations provided by the system may be provided in a separate screen area other than the central area. In this case, the user may select and use one of the plurality of stroke recommendations provided by the system. The user interface of the program for generating and correcting the 3D model has been described above.

Hereinafter, a method for generating and learning a 3D model will be described in more detail.

Figure 8:
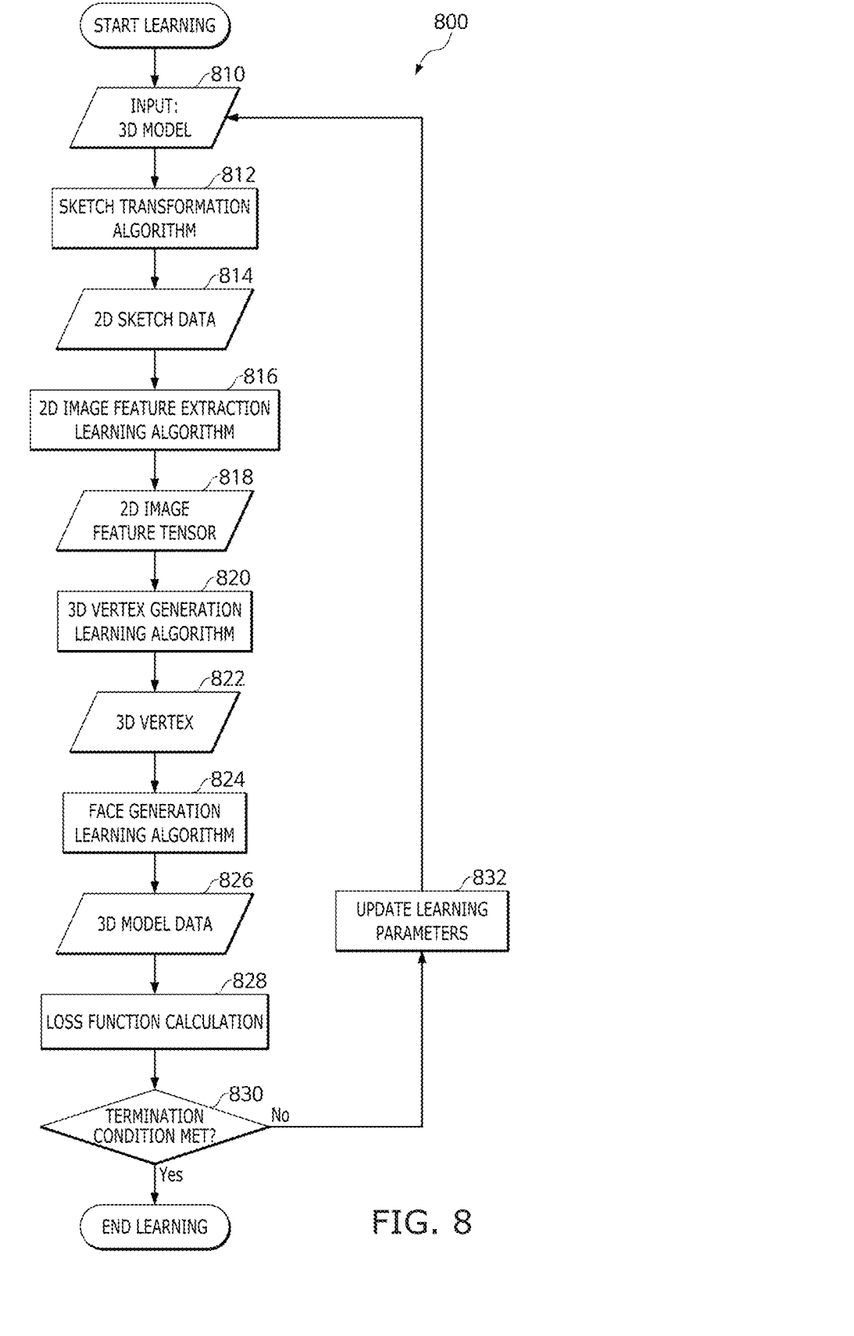
FIG. 8 is a flowchart illustrating an example of a method for learning a 3D model generation model by using a 2D sketch according to an embodiment.

FIG. 8 is a flowchart illustrating an example of a method for learning a 3D model generation model by using a 2D sketch according to an embodiment. In the present disclosure, 2D sketch data may be input into a 3D model generation model to generate a 3D model. In this case, the 3D model generation model may be a machine learning model configured to learn 2D sketch data associated with various 3D models in advance and convert the 2D sketch data into a 3D model based on the learning result.

In an embodiment, various 3D models and 2D sketch data associated with the same may be learned to generate an initial model of the 3D model generation model. Then, the information processing system 230 may receive a 3D model (810). The information processing system 230 may input the received 3D model into a sketch conversion algorithm/model 812 of the 3D model to generate 2D sketch data 814. In an embodiment, the received 3D model may be input into the sketch conversion algorithm/model 812 of the 3D model to automatically generate a plurality of 2D sketch data 814. In this example, the plurality of 2D sketch data 814 may be 2D sketch data of the 3D model viewed from different points and different angles. Any sketch conversion algorithm of the 3D model may be applied regardless of the type, as long as it is a machine learning model that generates a 2D sketch by using a 3D model.

When the 2D sketch data 814 is generated, the information processing system 230 may input it to a 2D image feature extraction learning algorithm 816 to extract a 2D image feature tensor 818 corresponding to the 2D sketch data 814. The 2D image feature tensor 818 may be a feature array including high-dimensional vectors for generating a 3D model. The 2D image feature extraction learning algorithm may be a deep learning model or a machine learning model such as ResNet, U-Net, Vision Transformer, and the like. Meanwhile, the present disclosure is not limited to the above, and various algorithms for extracting feature values in addition to the algorithms listed above may be used.

The information processing system 230 may input the 2D image feature tensor 818 to a 3D vertex generation learning algorithm/model 820 to determine the position of a 3D vertex 822. That is, the information processing system 230 may extract vertices for expressing the 3D model from the feature array of the 2D image. Polygen model may be used as the 3D vertex generation learning algorithm, but the embodiment is not limited thereto, and various algorithms capable of generating 3D vertices (vertices) from a 2D image may be used.

The information processing system 230 may input the 3D vertex 822 to a face generation learning algorithm 824 to infer a connection relationship between the determined positions of the vertices. In addition, the information processing system 230 may infer a method of connecting the faces by using the inferred connection relationship. Then, the information processing system 230 may generate 3D model data 826 based on the inferred method of connecting the faces. Polygen model may be used as the face generation learning algorithm 824, but the embodiment is not limited thereto, and various models for inferring the connection relationship between 3D vertices may be used.

The information processing system 230 may calculate (828) the loss function based on the generated 3D model and the initially input 3D model. The information processing system 230 may determine (830) whether or not a termination condition is achieved according to the calculation result of the loss function. Specifically, when the termination condition is met as a result of calculating the loss function, the information processing system 230 may end the learning. On the other hand, when the termination condition is not met as a result of the calculation of the loss function, the information processing system 230 may update (832) the learning parameter, return to the step of 810, receive another 3D model, and repeat subsequent steps. As a result, according to the present disclosure, it is possible to learn the relationship between the 2D sketch image and the 3D model, and learn and update the algorithm/model for generating the 3D model from the 2D sketch image.

Hereinafter, a method for generating a 3D model based on an irregular-shaped sketch will be described in detail.

Figure 9:
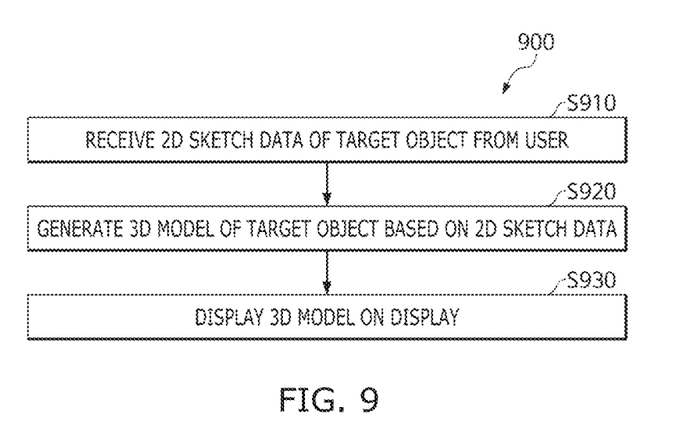
FIG. 9 is a flowchart illustrating an example of a method for generating a 3D model based on an irregular-shaped sketch according to an embodiment.

FIG. 9 is a flowchart illustrating an example of a method for generating a 3D model based on an irregular-shaped sketch according to an embodiment. It should be noted in advance that the flowchart of FIG. 9 and the description to be described below with reference to FIG. 9 are merely exemplary, and other embodiments may be implemented with various modifications. A method 900 for generating a 3D model based on an irregular-shaped sketch may be performed by at least one processor of the user terminal or the information processing system. The processor may receive 2D sketch data of the target object from the user, at S910. For example, the processor may receive 2D sketch data that includes a plurality of strokes. In this case, the 2D sketch data may be irregular-shape data.

The processor may generate a 3D model of the target object based on the 2D sketch data, at S920. For example, the processor may input 2D sketch data into the 3D model generation model to generate a 3D model. For the details of the 3D model generation model, reference is made to the description of FIG. 8 provided above. For example, the 3D model generation model may be a machine learning model that is trained by using a plurality of 3D model training data, and a plurality of 2D sketch training data, which is generated based on the plurality of 3D model training data.

Meanwhile, when the 2D sketch data is received, the processor may input the 2D sketch data to the stroke recommendation model. In this case, the processor may generate a stroke recommendation for the 2D sketch data. In addition, the processor may display the 2D sketch data and the stroke recommendation in a superimposed manner.

In this case, in response to a user input for generating a 3D model, the processor may generate new 2D sketch data combining the 2D sketch data and the stroke recommendation, and generate a 3D model based on the generated 2D sketch data.

The processor may display the generated 3D model on the display, at S930. The processor may receive an additional stroke for correcting the 3D model while the 3D model is displayed on the display. In this case, the processor may generate 2D sketch data combining the 3D model and the additional stroke, and input it to the 3D model generation model to generate a corrected 3D model.

In addition, after the 3D model is generated, the processor may receive an additional stroke for correcting the 3D model, into the 2D sketch image corresponding to the 3D model. In this case, the processor may generate new 2D sketch data combining the 2D sketch image and the additional stroke, and input it to the 3D model generation model to generate and correct a 3D model.

The method for generating a 3D model by using 2D sketch data has been described above. As a result, according to the present disclosure, after modeling of a 2D image into a 3D image, it is possible to effectively search for a variety of combinations of designs in the initial design stage by correcting the 3D model according to user inputs.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of this disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transfer of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. Also, any connection is properly referred to as a computer-readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the embodiments described above have been described as utilizing aspects of the currently disclosed subject matter in one or more standalone computer systems, embodiments are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some embodiments herein, various modifications and changes can be made without departing from the scope of the present disclosure, which can be understood by those skilled in the art to which the present disclosure pertains. In addition, such modifications and changes should be considered within the scope of the claims appended herein.

What is claimed is:

1. A method for automatically generating a 3D model, the method executed by one or more processors and comprising:
   receiving 2D sketch data of a target object;
   inputting the 2D sketch data into a 3D model generation model to generate a 3D model of the target object; and
   displaying the generated 3D model on a display,
   wherein the generating the 3D model comprises:
   inputting the 2D sketch data into a first machine learning model to extract an image feature array;
   inputting the extracted image feature array into a second machine learning model to determine positions of 3D vertices for expressing the 3D model; and
   inputting the determined positions of the 3D vertices into a third machine learning model to infer connection relationship between the 3D vertices.

2. The method of claim 1, wherein the receiving the 2D sketch data comprises receiving a plurality of strokes from a user, and the method further comprising:
   receiving an additional stroke from the user;
   inputting the additional stroke into the 3D model generation model to generate an updated 3D model of the target object; and
   displaying the updated 3D model on the display.

3. The method of claim 2, wherein the additional stroke is received while the 2D sketch data is displayed on the display.

4. The method of claim 2, wherein the additional stroke is received while the 3D model is displayed on the display.

5. The method of claim 1, wherein the 3D model generation model is a machine learning model trained by using a plurality of 3D model training data and a plurality of 2D sketch training data generated based on the plurality of 3D model training data.

6. The method of claim 1, wherein the receiving the 2D sketch data comprises:
   receiving a plurality of strokes from a user;
   inputting the plurality of strokes into a stroke recommendation model to generate a stroke recommendation; and
   displaying the stroke recommendation on the display.

7. The method of claim 6, wherein the stroke recommendation is displayed in a superimposed manner with the plurality of strokes, and
   the stroke recommendation is displayed in a color or transparency different from that of the plurality of strokes.

8. A non-transitory computer-readable recording medium storing instructions for execution by one or more processors that, when executed by the one or more processors, cause the one or more processors to perform the method according to claim 1.

9. An information processing system comprising:
   a communication module;
   a memory; and
   one or more processors connected to the memory and configured to execute one or more computer-readable programs included in the memory, wherein the one or more computer-readable programs further include instructions for:
   receiving 2D sketch data of a target object from a user;
   inputting the 2D sketch data into a 3D model generation model to generate a 3D model of the target object; and
   displaying the generated 3D model on a display,
   wherein the generating the 3D model comprises:
   inputting the 2D sketch data into a first machine learning model to extract an image feature array;
   inputting the extracted image feature array into a second machine learning model to determine positions of 3D vertices for expressing the 3D model; and
   inputting the determined positions of the 3D vertices into a third machine learning model to infer connection relationship between the 3D vertices.

* * * * *